United States Patent Office 3,262,217
Patented July 26, 1966

3,262,217
APPARATUS FOR THE CONTINUOUS TREATMENT OF SOLID PARTICLES IN A FLUIDIZED STATE
Ernest C. Brown, Danvers, and Robert S. Temple, Concord, Mass., assignors to Wolverine Corporation, a corporation of Massachusetts
Filed Oct. 23, 1963, Ser. No. 318,262
6 Claims. (Cl. 34—57)

This invention relates to the treatment of solid particulate material with a gaseous medium brought into heat exchange or other treating relation therewith, and more specifically to the provision of improvements in apparatus for carrying out such treatment in a continuous as distinguished from a batch operation.

The invention deals particularly with apparatus in which the particles are fed in at one end of a generally horizontal vibrating trough and move to and drop off the exit end thereof in continuous flow while being fluidized by spaced jets of a gaseous medium directed downwardly onto the particles and withdrawn upwardly away from the fluidized particles between the jets.

In operating said machines, the capacity of a machine of feasible length has been limited. A major requirement has been that particles to be treated dwell in the apparatus for a given length of time to insure adequate treatment. If the frequency and amplitude of vibration of the trough are adjusted to provide a given dwell, the number of particles fed per unit of time can be readily increased, were the bed *un*aerated, thereby increasing the capactiy of the apparatus by increasing the thickness of an unaerated bed without changing the frequency or amplitude of vibration and thus without changing the rate of advance of any individual particle.

However, when a particle bed is fluidized, its viscosity is so reduced that the angle of repose of the fluidized bed is much less steep than that of an unfluidized bed and approaches the horizontal angle of repose of a liquid. The result is that, as the number of particles fed into a fluidized bed per unit of time is increased, the primary result is to create a head at the infeed end which sets up forces causing the particles to pass through the trough and out the open exit end thereof at a velocity of linear advance greater than that imparted by the vibrating trough, without much, if any, increase in the thickness of the fluidized bed, and therefore without materially increasing the capacity of the machine. The greater the height of the head, the greater the additional forces, the greater the velocity and the less the dwell time.

Accordingly, adequate dwell time being a governing factor for proper thermal treatment of many particles, no head could be tolerated which, taken with the trough vibration forces, caused velocities exceeding the desired dwell time in a given length of treatment zone. Even when the frequency of vibrations was reduced to zero, so that the bed became stationary and the velocity of linear advance was then caused solely by the head, still there was a limitation on capacity because the angle of repose of the fluidized bed is so very flat that the top of the bed assumed a slope which extended a very great part of, if not the whole, length of the conveyor. Under these conditions, when the head is increased beyond a certain value, here again it merely causes an increased velocity, the head creating a slope much greater than the angle of repose and a consequent increase in velocity and inadequate dwell time.

The angle of repose of an *un*fluidized bed of particles advancing along a vibrating conveyor is so steep that, in a feasible length of apparatus, the depth of the unfluidized bed can be maintained substantially uniform except for a short distance from the drop-off end. Upon fluidization of the bed, however, the slope becomes so flat and extends so far back from the drop-off end of the trough that, even if the head is not increased beyond that which will maintain the velocity of linear advance along a vibrating trough constant, there is still a large loss of contained capacity because of the long taper in the depth of the advancing fluidized bed extending towards the drop-off end of the trough. Uniform depth in a long fluidized bed terminating in a drop-off cannot be maintained; it always has a long taper, thus reducing the number of particles over those that would be present at the same rate of feed were the particles not fluidized.

It is hence an object of the invention to provide increased capacity in apparatus of this character having a given length, air velocity and tube geometry, without substantially affecting the time of treatment of any one particle and thus still insuring uniformity in treatment of all the particles.

It is a further object of the invention to provide a simple control whereby increasing rate of feed of the particles to the apparatus within certain limits (i.e. up to the choke point) does not simultaneously increase the velocity of linear advance, which can therefore be maintained constant to insure adequate and identical dwell time with that secured with a lesser rate of input feed.

This is accomplished by creating beyond the exit end of the treating zone a counterhead or dam in the form of an advancing bed of the treated particles in an unfluidized state, with the bed having an overall length greater than the projection of the slope of the leading edge of the advancing unfluidized bed at the drop-off end.

The rate of advance of this unfluidized and hence densified bed can be controlled by having it form on a vibrating trough having vibrations of fixed amplitude but adjustable frequency. Conveniently, the dam is formed on a trough which is an extension of and integral, and therefore vibrated in synchronism, with the treating zone trough. If the feed to the treating zone is increased with a constant vibration frequency, the depth of the unaerated densified bed is increased since its rate of advance remains constant. As its depth is increased, the trailing end of the unaerated densified bed forms a constantly yielding resistance or dam to the emergence of fluidized particles from the leading end of the aerated treating zone, with two resultant effects.

First, no one particle advancing from the treating zone into the unaerated bed below the top level of the unaerated bed can do so at any linear rate faster than the rate of advance of each particle in the damming unaerated bed, which rate can be absolutely controlled by the frequency and amplitude of vibrations imparted to the trough.

Secondly, since, as the head at the entering end of the treating zone is increased, the depth of the unaerated bed is automatically increased at a given frequency and amplitude, the slope of the aerated bed never exceeds the angle of repose of the particles in the fluidized state, since the location of the top end of the slope does not progress backwardly of the treating zone as the head increases, but rather remains horizontally stationary since the depth of the unaerated bed increases by a constant increment with each increment of increase in the height of the head.

Accordingly, if one wishes a dwell time of say 3½ minutes in a treating zone 3 feet wide and 20 feet long, but wishes to roast 6000 pounds of particles, e.g. peanuts, per hour instead of 5000 pounds per hour, the weight of particles which is in the treating zone at any one time can be substantially increased leaving the vibration frequency unchanged since the volume in the unaerated bed increases by an increase of depth, resulting also in an increase in depth of the fluidized bed; hence capacity is substantially increased by the 1000 extra pounds per hour but the rate of advance of individual particles from infeed to output remains constant. The increased poundage throughput is accounted for solely by an increased number of particles per sq. foot throughout the trough at any one instant.

In order that the treatment will be abruptly terminated as the particles advance into the unaerated bed, the portion of the trough supporting the unaerated bed is cooled.

The above objects, and the principles resorted to for obtaining the same, may be better understood by reference to a description of a typical apparatus embodying the invention as shown in the accompanying drawing wherein.

Figure 1:
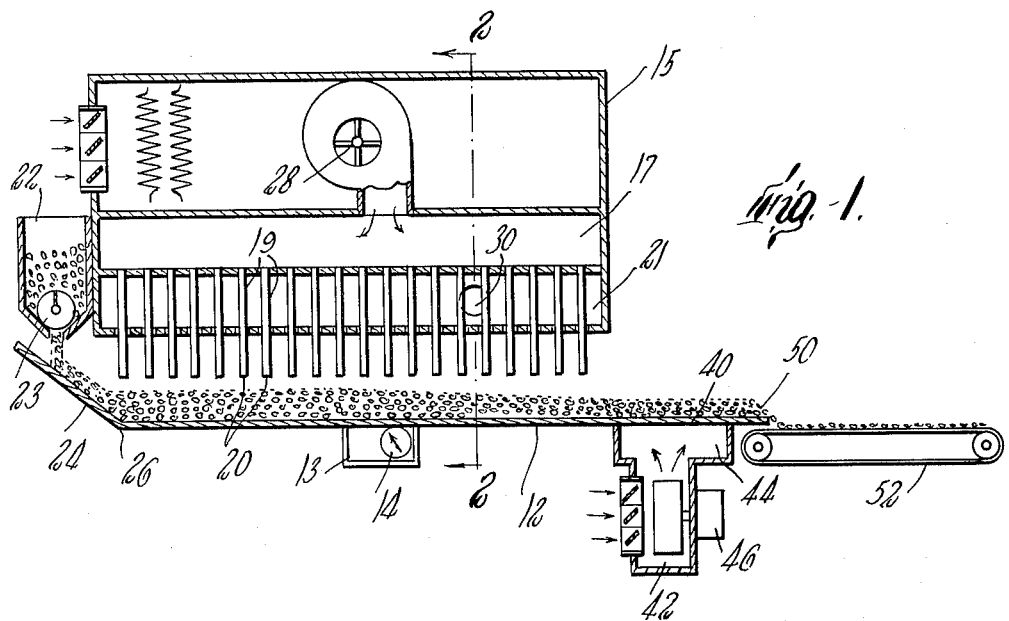
FIG. 1 is a diagrammatic elevational view of an apparatus in accordance with the invention.
Figures 2, 3:
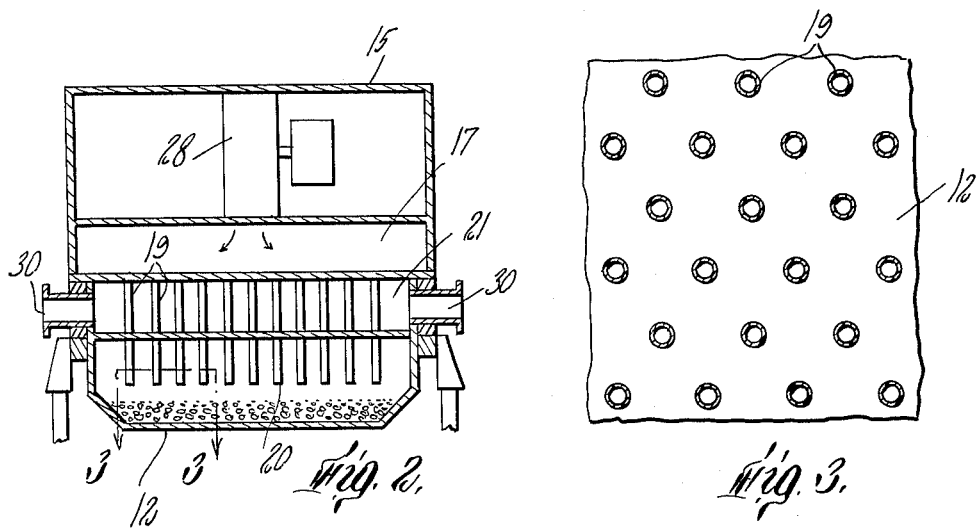
FIG. 2 is an enlarged cross-sectional view of the apparatus shown in FIG. 1.
FIG. 3 is a fragmentary cross-sectional view showing the pattern arrangement of the nozzles.

The apparatus includes a substantially horizontal elongated imperforate trough 12 which is provided with a conventional vibrating conveyor mechanism indicated at 13, having an adjustable frequency and/or amplitude control 14. The trough 12 is surmounted over the major portion of its length by a housing 15 which contains a plenum 17 leading to a series of spaced tubes 19 which have orifices 20 lying in a single horizontal plane parallel to the plane of the trough.

A hopper 22 is provided at the infeed end of the trough 12 for feeding particles at a metered rate as by a screw conveyor 23 whose r.p.m. is adjustable down onto an inclined plate 24 leading to a junction 26 with the horizontal trough beneath the first row of nozzles 19. The plate 24 may be attached to and vibrate with the trough 12.

The portion of the trough 12 beneath the superimposed housing 15 constitutes a treating zone to which a fan 28 supplies heated air at high velocity through the tubes 19 which direct gaseous streams perpendicularly downwardly towards the trough 12, the gases being exhausted upwardly between the tubes 19 to exhaust chamber 21 and outwardly through ports 30 to the atmosphere or if desired to a closed circulating system.

Beyond the end of the superstructure there is a trough extension portion 40, integral with and in the same plane as the trough, which has no superimposed tubes but which has its undersurface exposed to a stream of cool air which is blown thereagainst from a conduit 42 and underlying chamber 44 by a suitable fan 46.

Also indicated in the drawings is the general shape of the fluidized bed of particles as it advances through the treating zone, exaggerated in depth for purposes of clarity.

As previously indicated, since the fluidized bed has a very flat angle of repose, it tends to taper towards the exit end of the treating chamber, the taper typically extending as shown in the drawings back about half way of a 20 foot treating chamber and the remaining portion being of substantially uniform depth.

The material on the extension 40 in a state of subsidence as contrasted with its previous fluidized state, while of uniform depth is much densified as compared with the fluidized bed in the treating chamber and as shown terminates in a fall-off slope 50 which corresponds substantially to the angle of repose of the unaerated bed. The particles fall onto an endless withdrawal conveyor indicated at 52 which operates at a linear speed greater than the rate of advance of the unaerated bed on the trough extension 40.

Figure 4:
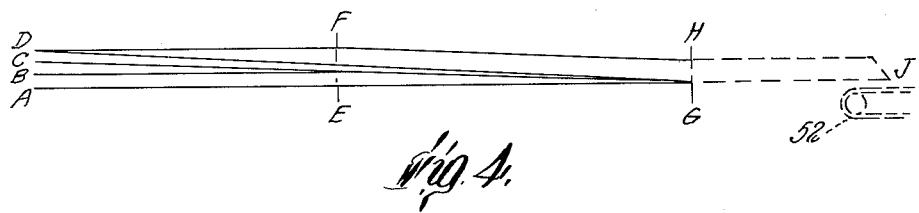
FIG. 4 is a diagrammatic geometrical sketch helpful in explaining the principles in accordance with which the apparatus operates.

FIG. 4 is a geometric figure wherein the line AG represents the trough surface from the inlet end up to the termination of the treatment chamber at G and the dotted line GJ represents the extension 40. If the trough ended at G so that particles fell off the end of the trough at G, FIG. 4 illustrates what would happen with three different heights of head at the inlet end B, C and D. If the height of the fluidized bed at entry is only at level B, the top surface of the bed in the treating zone will slope as from E to G because of the flat angle of repose of the fluidized bed. If the head is increased to C at constant trough vibration frequency, it will be seen that the slope of the bed will extend all the way back to the inlet end in a straight slope from C to G. If then the head is further increased to the level D at the inlet end, the top surface of the bed will have an even steeper slope than that at the level C, with the result that the particles will flow from D to G with increased velocity over and above that imparted by the trough vibration, thus decreasing their dwell time.

By adding the extension GJ on which the unaerated bed forms, it will be seen that a counterhead or resistance against speed-up will occur at the vertical line GH, with the result that the fluidized bed will taper only from F to H and will be substantially level on top from D to F. Thus, by adding the extension GJ one gains the capacity represented by the five-sided area DFHG over and above that which would be obtained if the trough ended at G and despite the fact that the head D is equal in both cases. FIG. 4 therefore demonstrates the increase in dwell time by the use of the extension GJ whereon the fluidized bed merges into an unfluidized bed whose advance is controlled by the applied vibrating motion regardless of the rate of infeed.

The apparatus is useful in the food industry for roasting, drying or cooling materials such as nuts, cocoa beans, coffee beans, grains, cereals, dehydrating vegetables, for example, peas and beans, and for conditioning plastic particles, rubber particles, etc., for industrial purposes.

What is claimed is:

1. Apparatus for thermally treating particles as they advance continuously comprising a substantially horizontal elongated trough, means for feeding particles continuously and at a constant rate into one end of said trough, means for vibrating said trough with an amplitude and frequency to cause said particles to advance along said trough and drop off an open exit end thereof, a series of nozzles arranged to project hot gaseous streams perpendicularly downwardly into a portion of said trough to fluidize said particles as they move therealong, means for exhausting said gases upwardly away from said trough between said nozzles, said trough portion constituting a leading treating zone located in advance of an adjoining trough portion constituting a trailing exit zone wherein said particles are deaerated and densified upon losing their fluidization as they emerge from said treating zone, said exit zone portion of said trough having a length exceeding the projection of the slope of the leading edge of said advancing deaerated unfluidized particles at the drop-off end of said trough, and means for controlling the vibrations of said trough to maintain a fixed rate of advance of said unfluidized particles through said exit zone regardless of the rate of particle feed from said feeding means, thereby creating a resistance controlling the rate of advance of said fluidized particles through said treating zone so that the dwell time of said fluidized particles in said treating zone remains constant but their depth increases as said rate of feed is increased and permitting, within limits, a higher rate of said feed, without exceeding a required minimum dwell time of said particles in said treating zone, than would be procured were said exit zone trough portion not present.

2. Apparatus as claimed in claim 1, wherein said nozzles are enclosed within a housing and said exit zone is outside said housing.

3. Apparatus as claimed in claim 1, having means for cooling said unfluidized particles as they advance along said exit zone trough portion.

4. Apparatus as claimed in claim 1, having means for cooling the exit zone portion of said trough.

5. Apparatus as claimed in claim 4, wherein the cooling means comprises a fan and ducts for conducting cool air against the underside of said exit zone trough portion.

6. Apparatus as claimed in claim 1, having adjustable metering means for changing the rate of feed of said particle feeding means independently of the vibration frequency of said vibrating trough.

References Cited by the Examiner
UNITED STATES PATENTS

| | | | |
|---|---|---|---|
| 2,044,744 | 6/1936 | Hansen | 34—10 X |
| 2,371,619 | 3/1945 | Hartley | 34—57 X |
| 2,513,369 | 7/1950 | Shaw | 34—57 X |
| 3,166,383 | 1/1965 | Morris | 34—10 |

WILLIAM F. O'DEA, *Primary Examiner.*

D. A. TAMBURRO, *Assistant Examiner.*